US005670040A

United States Patent [19]

Ahluwalia

[11] Patent Number: 5,670,040
[45] Date of Patent: Sep. 23, 1997

[54] INTERNAL PLATELET HEAT SOURCE AND METHOD OF USE IN A SUPERCRITICAL WATER OXIDATION REACTOR

[75] Inventor: Kawaljit Singh Ahluwalia, Montville, N.J.

[73] Assignee: Foster Wheeler Development Corporation, Livingston, N.J.

[21] Appl. No.: 696,205

[22] Filed: Aug. 13, 1996

Related U.S. Application Data

[62] Division of Ser. No. 394,864, Feb. 27, 1995, Pat. No. 5,571,424.

[51] Int. Cl.$^6$ ................................................. C02F 1/72
[52] U.S. Cl. .................. 210/198.1; 210/205; 422/199; 422/208; 422/242
[58] Field of Search ........................ 210/198.1, 205; 422/199, 208, 242

[56] References Cited

U.S. PATENT DOCUMENTS

| | | | |
|---|---|---|---|
| 3,881,701 | 5/1975 | Schoenman et al. | 259/4 |
| 3,914,347 | 10/1975 | Kors et al. | 261/23 |
| 3,914,348 | 10/1975 | Kors et al. | 261/23 |
| 4,113,446 | 9/1978 | Modell et al. | 48/202 |
| 4,338,199 | 7/1982 | Modell | 210/721 |
| 4,818,371 | 4/1989 | Bain et al. | 208/106 |
| 4,822,497 | 4/1989 | Hong et al. | 210/721 |
| 5,008,085 | 4/1991 | Bain et al. | 422/109 |
| 5,252,224 | 10/1993 | Modell et al. | 210/695 |
| 5,262,060 | 11/1993 | Lehmann et al. | 210/696 |
| 5,384,051 | 1/1995 | McGinness | 210/761 |
| 5,387,398 | 2/1995 | Mueggenburg et al. | 422/168 |

OTHER PUBLICATIONS

Gloyna, et al., "Supercritical Water Oxidation: An Engineering Update," stated to be presented to Gulf Coast Hazardous Research Center, Lamar University, Beaumont, TX, Feb. 1992, 25 pages.

"Assessment and Development of an Industrial Wet Oxidation System for Burning Waste and Low-Grade Fuels," Stone and Webster Engineering Corp., Final Report, Sep. 1989.

Primary Examiner—Neil McCarthy
Attorney, Agent, or Firm—Fitzpatrick, Celia, Harper and Scinto

[57] ABSTRACT

A process and apparatus for the supercritical water oxidation of organic waste materials which avoids or at least substantially reduces the corrosion and solids deposition problems associated with prior art techniques and which provides for efficient heating of the waste material to reaction conditions. Externally heated supercritical water is fed to a compound platelet tube reactor. The compound reactor includes a reaction zone and inner (smaller) and outer (larger) concentric platelet tubes supported concentrically within a shell. The water fed to the reactor both protectively coats surfaces of the inner and outer platelet tubes facing the reaction zone and heats the waste stream to oxidation reaction conditions. Higher reaction temperatures can be used as compared to prior art processes, which significantly improves the reaction rate and permits smaller reactors to be used. The protective films of water on the surfaces of the platelet tubes, coupled with the elimination of preheating of the waste material, substantially reduces solids deposition and corrosion.

12 Claims, 8 Drawing Sheets

INTERNAL PLATELET HEAT SOURCE AND METHOD OF USE IN A SUPERCRITICAL WATER OXIDATION REACTOR

This application is a division of application Ser. No. 08/394,864, filed Feb. 27, 1995, which is now U.S. Pat. No. 5,571,424.

BACKGROUND OF THE INVENTION

1. Field of the Invention

This invention relates to an internal, transpiring-wall, platelet heat source and method of use in a supercritical water oxidation reactor and, in particular, to such a method and apparatus useful for the destruction of organic waste materials.

2. Description of the Related Art

It is known that the fluid and solvating properties of water change dramatically at its thermodynamic "critical point"— i.e., at a temperature of about 706° F. and a pressure of about 3204 pounds per square inch ("psi"). In particular, water above its critical point is a single-phase-fluid which is completely miscible with oxygen and most organic compounds. At supercritical water conditions, mass transfer limitations which limit the usefulness of oxidation processes in subcritical water are eliminated and the solubility of inorganic salts drops to the parts per million range. With the addition of oxygen, efficient destruction of organic compounds by oxidation is achieved, while inorganic substances can be separated and withdrawn for disposal. Specifically, organic compounds may be oxidized in supercritical water to produce carbon dioxide and water. Following the oxidation, inorganic materials may be removed as dry solids or precipitated as salts and removed as a brine. A significant advantage of such a process is the extremely short residence time required, on the order of 5–20 seconds depending on process temperature, for destruction of organic compounds.

Supercritical water oxidation—defined as a process for oxidizing organic waste compounds in supercritical water— has emerged as a potentially environmentally attractive technique for the safe and effective treatment of organic wastes and sludges. However, while organic compounds are completely miscible in supercritical water, inorganic salts present in the aqueous waste materials, or generated during the oxidation reaction, are essentially insoluble and may be deposited as solids on reactor and other system surfaces, which may lead to plugging and low operating efficiencies. In addition to that solids deposition problem, corrosion of reactor and system surfaces has also occurred in supercritical water oxidation processes. Due to these problems, supercritical water oxidation generally has not been successfully commercialized for the treatment of organic wastes and sludges.

Various attempts have been made to rectify these problems. For instance, U.S. Pat. No. 4,822,497 discloses a reactor designed so that the supercritical temperature process stream is transferred to a cooler zone in the same vessel at high pressure to form a brine which facilitates the removal of solids. More recently, U.S. Pat. No. 5,252,224 discloses a supercritical water oxidation process in which the reaction mixture is passed through the reactor at a velocity sufficient to prevent settling of a substantial portion of the solid particles from the reaction mixture.

There is still a need for a supercritical water oxidation process and system which avoids the above-mentioned significant problems of solids deposition and corrosion.

Figure 1:
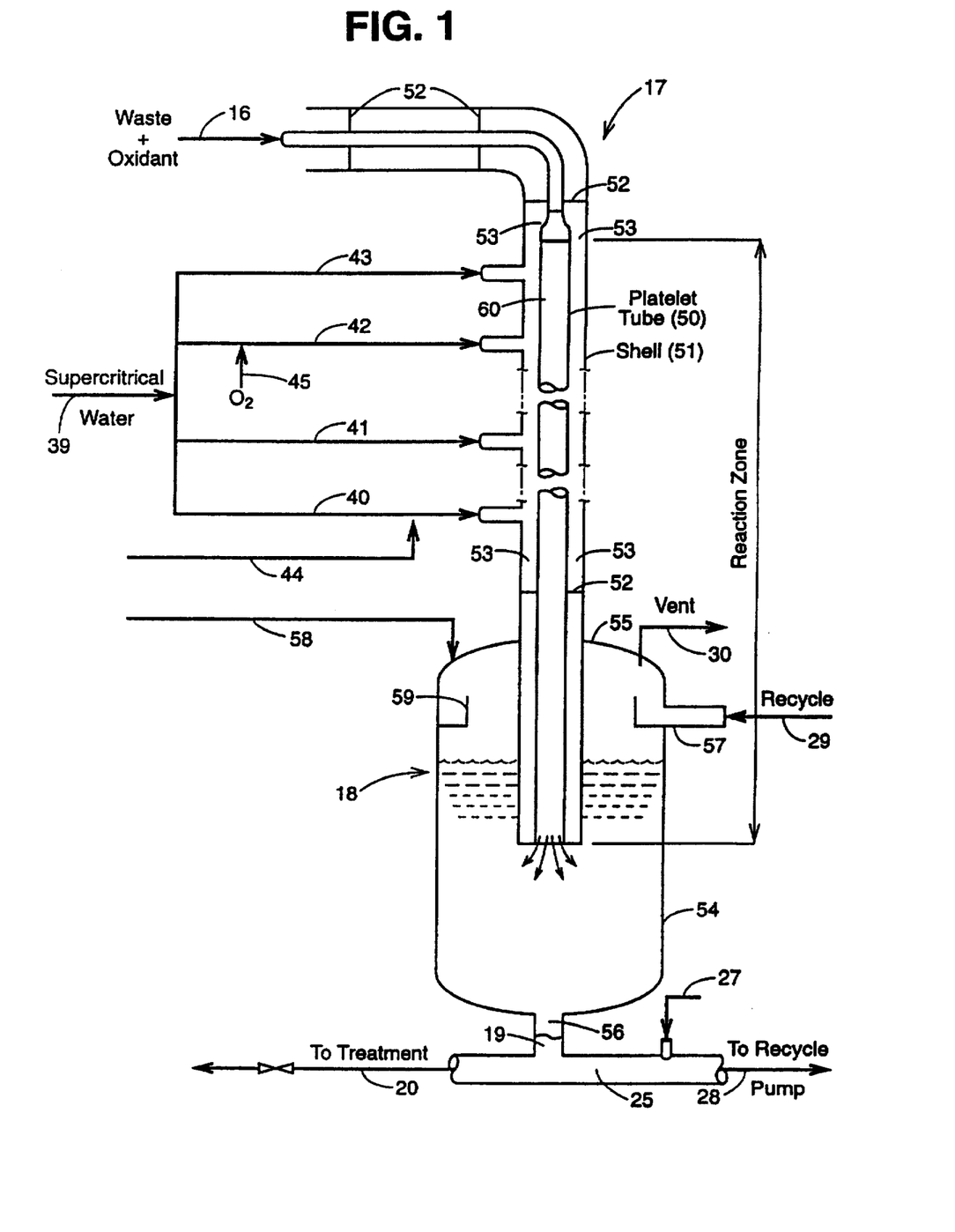
FIG. 1 illustrates a process and apparatus useful for supercritical water oxidation according to commonly assigned, copending U.S. patent application, Ser. No. 08/320,426, filed Oct. 14, 1994.

Still more recently, commonly assigned, copending U.S. patent application, Ser. No. 08/320,426, filed Oct. 14, 1994, has proposed solutions to the foregoing problems. FIG. 1 illustrates one embodiment of a process and apparatus for the supercritical water oxidation of an organic waste material according to that copending application.

As shown in FIG. 1, a Waste material at a high pressure (e.g., about 3500–6000 psi) is fed with oxidant via line 16 to a tubular reactor 17. The temperature of the waste is typically ambient (e.g., about 70° F.) but may be higher. Depending on the waste material, the temperature should be no more than about 650° F.

Oxygen or other suitable oxidizing agent is supplied with the waste material to the reactor 17 via line 16. Alternatively, or in addition, oxygen (or other oxidant) may be supplied to one or more points along the length of the reactor. For example, as shown in FIG. 1, oxygen may be supplied to reactor 17 through lines 45 and 42. The place of oxidant addition to the reactor depends on the properties of the particular waste being treated. The addition of oxygen along the length of the reactor permits control of the reaction rate, and hence the temperature rise, within the reactor.

If the intrinsic heat value of the waste material is low, a supplemental fuel also can be fed to the reactor along with the pressurized stream of waste material and oxidant. Any convenient gaseous or liquid fuel may be employed (e.g., alcohol, methane, methanol, etc.). Ignition of the supplemental fuel in the reactor provides the additional energy necessary to sustain the oxidation reaction. Preferably, however, the temperature of the pressurized waste/oxidant stream is increased from about ambient to reaction temperature by injection of water at supercritical conditions into the waste stream at one or more stages along the tubular reactor.

Reactor 17 generally comprises a platelet tube concentrically supported within a tubular shell. By "platelet tube" is meant a tube whose wall is formed of a plurality of stacked, thin plates having a large number of precisely engineered fluid passages formed therein to allow a fluid such as water to pass through the wall from outside to inside, the number and shape of the interior openings of those fluid passages being designed to provide a thin, protective film of water on substantially the entire interior platelet tube surface.

Platelet tubes are known to be useful, for example, in cooling surfaces of aerospace vehicles. They are commercially available from Aerojet-General Corporation, Rancho Cordova, Calif.

Generally, platelet tubes may be designed so that the injected supercritical water heats the waste stream to reaction temperature and provides protection to the inner reactor surface. In order to heat the waste stream, the platelet wall fluid passages may be designed to inject relatively large streams of supercritical water directly into the main body of the waste stream at appropriate points along the length of the reactor. In order to protect the inner surface of the platelet tube from solids deposition and corrosion, the platelet wall may also include a large number of smaller openings for injecting supercritical water into the region along that wall. The particular design of such smaller openings is not critical and may be varied as long as an adequate protective thickness of clean, supercritical water is provided on substantially the entire inner surface of the platelet tube. For example, a "transpiration" type platelet tube may be employed, in which a large number of small openings are provided in the plate forming the inner surface of the tube such that fluid is injected essentially in a direction perpendicular to the tube inner surface. The net result of this type of fluid injection is that the injected fluid will mix with the main flow of waste and simultaneously provide a thin film of clean supercritical fluid along the reactor wall.

Alternatively, and in a preferred embodiment according to the aforementioned copending application, the small surface openings are specially designed to inject the fluid in a direction substantially parallel to the interior tube surface, laying down on that surface a thin protective film of supercritical fluid. In this embodiment, that protective film will be provided for a short length along the interior tube wall from each aperture, after which the fluid will tend to mix with the main body of waste and increase its temperature. In another embodiment, both types of small openings (i.e., perpendicular and parallel injection) may be provided in the platelet tube inner surface to simultaneously heat the waste stream and protect the platelet tube inner surface.

Figure 2:
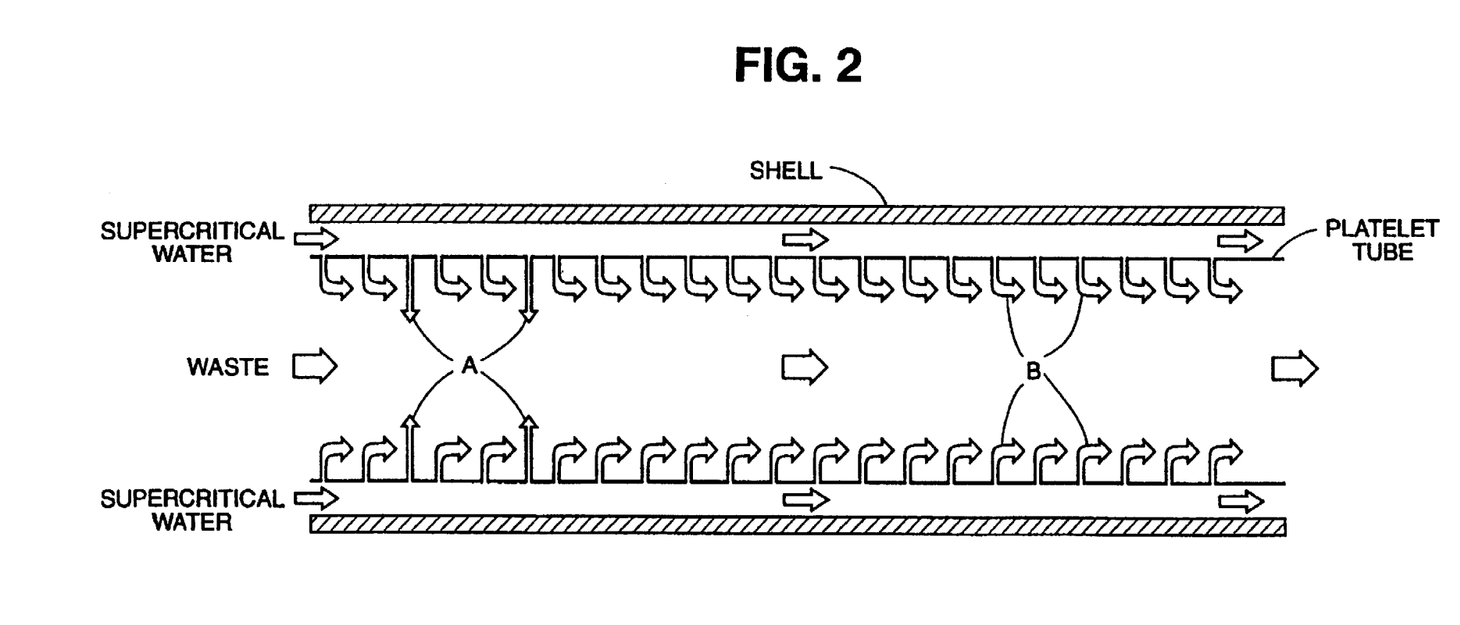
FIGS. 2–7 show, in even more detail, several embodiments of platelet tube-type reactors which may be used according to the disclosure in the copending application.

FIG. 2 schematically illustrates how the supercritical water may be supplied to the central passage of the platelet tube to both heat the waste stream and form a protective film along the inner surface of the platelet tube. As shown, waste is fed to and along the central passage of the platelet tube and supercritical water is fed to the annulus between the platelet tube and the shell. Fluid passages in the platelet tube wall, and a pressure drop across that wall, permit supercritical water to flow from the annulus through the tube wall and then into the central passage of the tube. The direction and amount of flow of supercritical water into the central passage is controlled by the size and shape of the fluid passages in the tube wall. For example, in order to heat the waste in the central passage, a number of generally perpendicular streams (designated "A" in FIG. 2) may be provided, whereas a large number of generally parallel streams (designated "B" in FIG. 2) provide wall protection.

Figure 3:
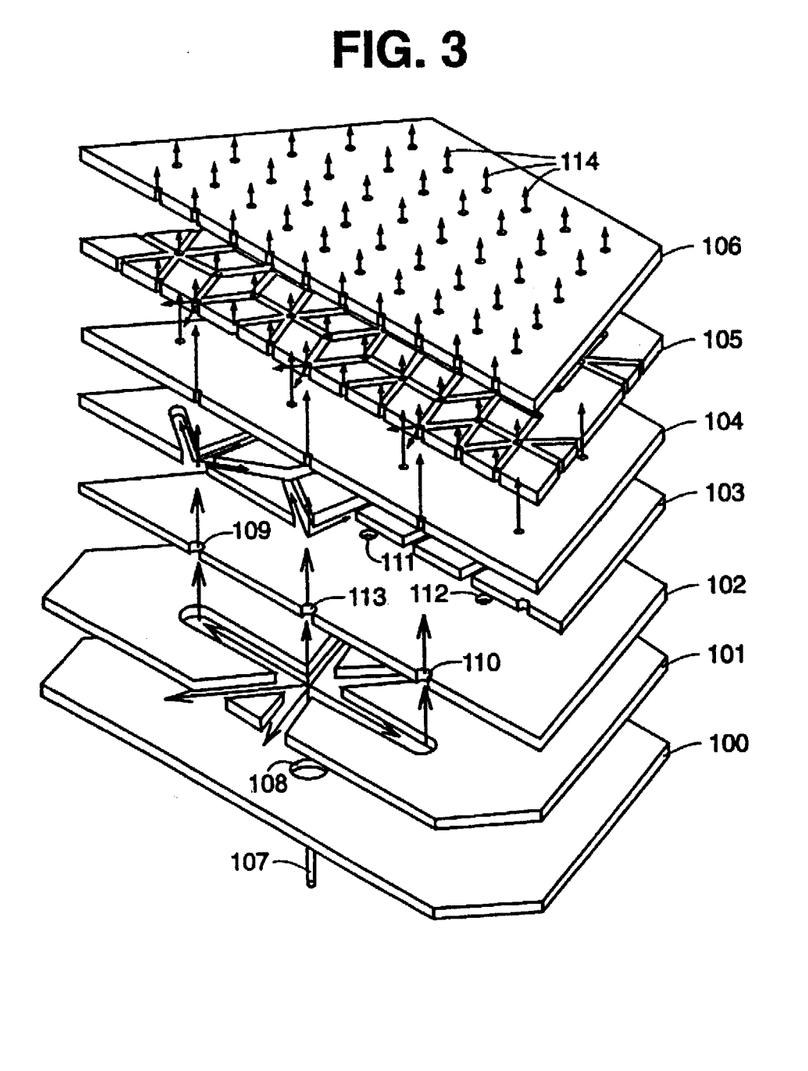

An example of a fluid flow pattern through the platelet tube wall that efficiently covers its inside surface with supercritical water is illustrated in FIG. 3. That figure shows an exploded view of a portion of a platelet tube wall composed of seven different plates 100 through 106. The pattern of flow in the illustrated embodiment is essentially hexagonal, with a single fluid inlet stream 107 being dispersed into 1,134 flow paths at the opposite side of the platelet wall. Specifically, a single fluid inlet stream 107 enters the tube wall through hole 108 in plate 100 and is immediately evenly distributed by six channels in plate 101 to six outlets on the hexagon in plate 102 (only four of which, reference numerals 109 through 112, are shown in FIG. 3) as well as flowing straight through hole 113 in plate 102. The stream in each of those outlets is then split into six other streams by hexagonal channels in plate 103, and a stream which flows straight through. The process is repeated through plates 104, 105 and 106 until the fluid finally exits the wall as 1,134 separate streams schematically illustrated 114 in FIG. 3.

Figures 4, 5:
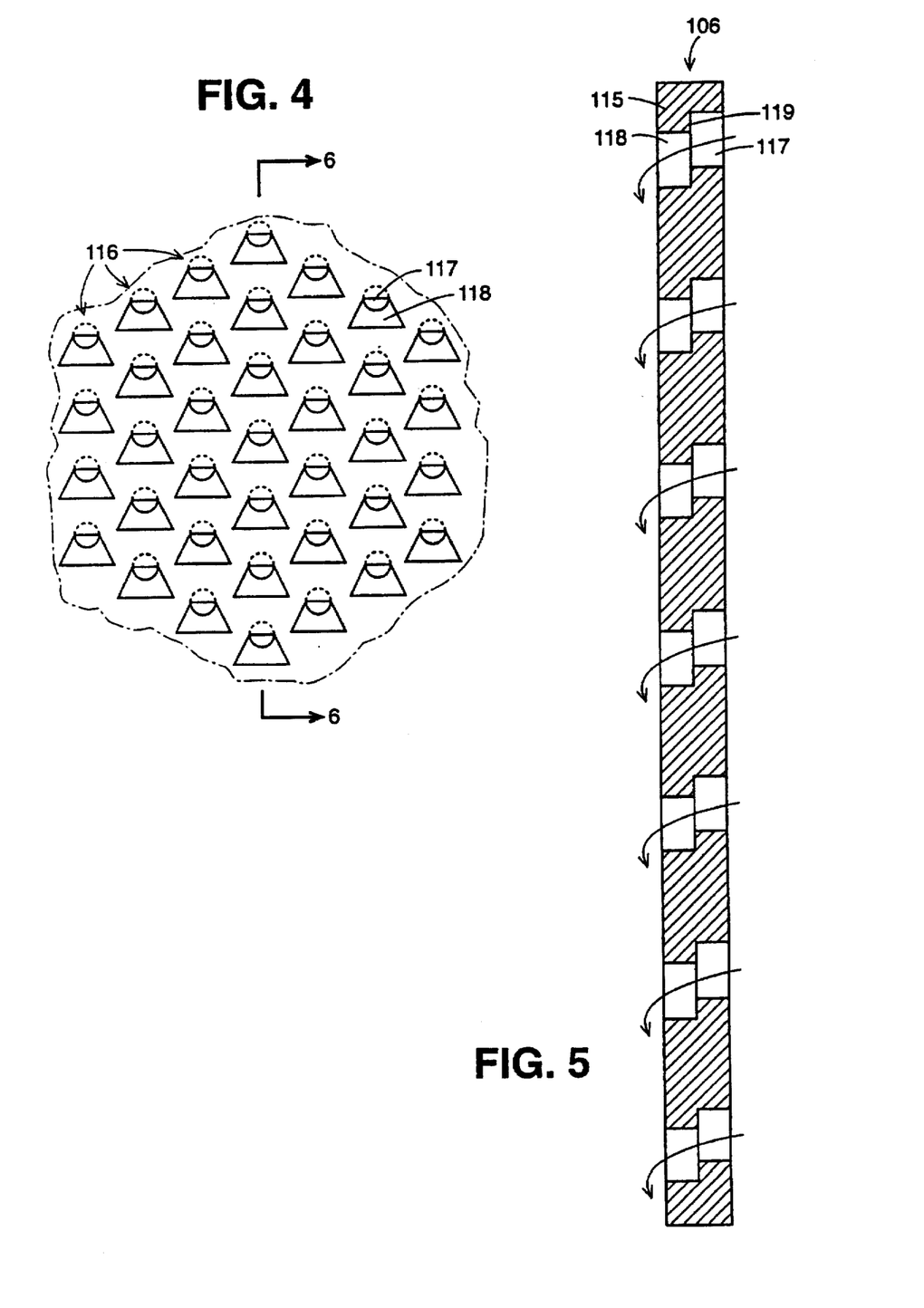

The shape of the apertures in plate 106 determines the direction of the fluid stream exiting those apertures into the central portion of the platelet tube. For example, FIGS. 4 and 5 illustrate an embodiment which creates a flow of fluid in a direction generally parallel to the flow of waste and along inner surface 115 of the platelet tube. FIG. 4 (which is a plan view of a portion of the inside surface of the platelet tube) shows a plurality of apertures 116 in plate 106, each aperture being defined by a circular opening 117 partially overlaid by a trapezoidal opening 118. As shown best in FIG. 5 (which is a cross-section taken along line 6—6 of FIG. 4), fluid flowing out through circular opening 117 is deflected by surface 119 so as to flow along inside tube surface 115. The apertures may be formed by any convenient technique.

Figure 6:
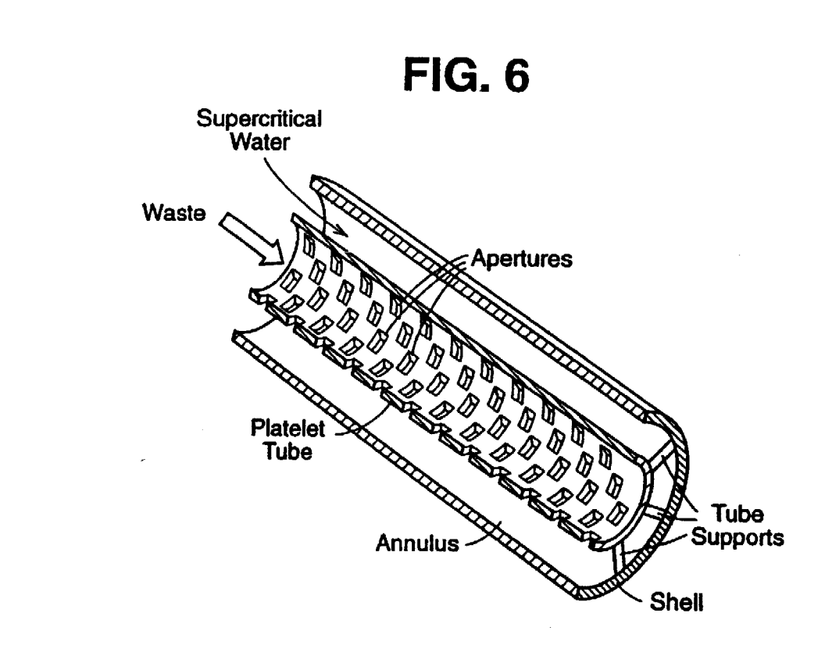

FIG. 6 illustrates an alternative embodiment in which the many apertures in the inner surface of the platelet tube are shaped such that the fluid streams emanating from them are directed substantially perpendicular to the inner surface of the tube, as shown schematically in FIG. 3. However, in addition to mixing with the main body of the waste stream to heat it, these many streams of clean, supercritical water also flow along the interior wall of the platelet tube to form a thin protective film.

Figure 7:
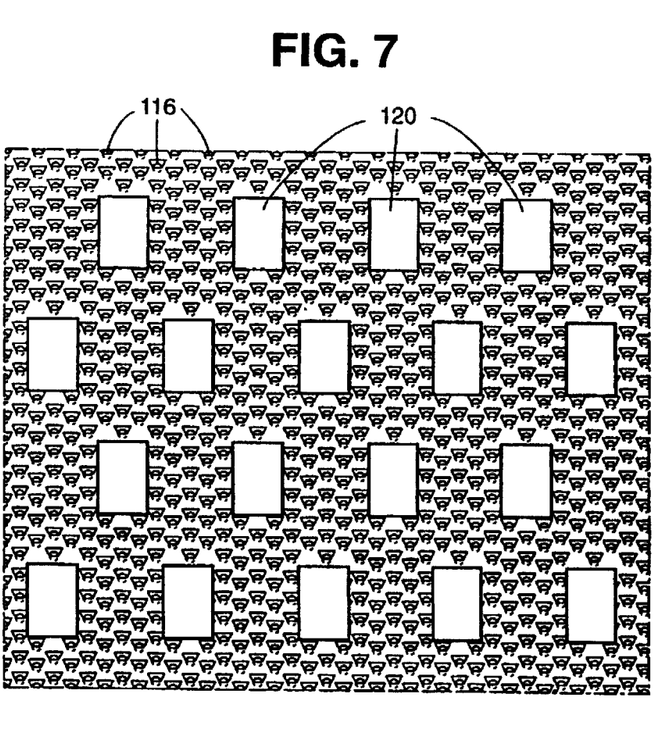

FIG. 7 illustrates yet another embodiment in which a combination of transpiration apertures 120 and wall protection apertures 116 are provided in the inner surface of the platelet tube. With such a design, and by appropriate selection of the number and size of each type of aperture, the degree of wall protection can be controlled along with the effect on the temperature of the waste stream in the reactor by the injected supercritical water.

As illustrated in FIG. 1, reactor 17 comprises a platelet tube 50 concentrically supported within a tubular shell 51 and support members 52. The platelet tube 50 defines a center tubular passage 60 into which the waste/oxidant mixture is fed for reaction. Between the outer wall surface of platelet tube 50 and the inner wall surface of shell 51 is provided an annular space 53 into which supercritical water is injected at one or more locations along the length of the reaction zone.

Because of the differential between the relatively high pressure of the injected supercritical water in annular space 53 and the somewhat lower pressure of the waste stream in center passage 60, the supercritical water readily flows from the annular space 53 through the fluid passages provided in the wall of the platelet tube 50, into center passage 60. As noted above, the fluid passage apertures provided on the inner surface of platelet tube 50 are designed to disperse the injected supercritical water as a thin film along that inner surface. As a result, the temperature of the waste/oxidant mixture in central passage 60 is increased while the thin film of water along the inner surface of platelet tube 50 protects that surface against deposition of solid material and corrosion. The thickness of the protective film is not critical. It is only necessary that the supercritical water be provided to the platelet tube so that a film is formed on the inner surface thereof so as to form a substantially continuous isolating layer of pure fluid between the reactor wall and the waste stream undergoing reaction.

The number and location of points along the reactor at which supercritical water is introduced into the annulus 53 are not critical and depend on, for example, the temperature, flow rate and heat content of the waste stream, the temperature and flow rate of the supercritical water, the size of the reactor, etc. The four points of addition shown in FIG. 1 are merely illustrative, and those skilled in the art recognize that a single addition may be sufficient, or that more than four points of addition can be used. Generally, the water injection along the length of the reactor is varied to allow temperature control within the reactor, provide an even flow distribution of water along the length of the platelet tube, assure substantially complete coverage of the surface of the reaction zone by a protective film of clean supercritical water, etc.

A substantial advantage of the design described in the aforementioned copending application is the avoidance of solids deposition and corrosion on the reactor walls. This is accomplished by providing the thin, protective film of water on the interior surface of the reactor tube, as described above, and also by eliminating extensive preheating of the waste material prior to reaction, which can cause both solids deposition and corrosion. Instead, according to this design, the waste is heated to reaction temperature by the injected supercritical water which may itself be heated outside the reactor by any suitable means. As shown in FIG. 1, for example, boiler-quality (i.e., clean) water, which is heated, is fed to the reaction zone through lines 40, 41, 42 and 43. In an alternative embodiment, pressurized colder water (e.g., about 4000 psi or higher and about 300° F.) may be injected into the reaction zone at or near the end of the reactor to quench the reaction products. In FIG. 1, this embodiment is illustrated by stream 44.

The particular oxidant employed for the reaction is not critical, and gaseous oxygen is preferred. Other oxidants which may be employed include hydrogen peroxide, air, etc.

FIG. 1 also shows a method of cooling and separating the reaction product components. As shown, the reactor 17 discharges directly into a liquid/gas separator 18 through inlet 55, and from which gaseous products are vented via stream 30. The solid and liquid components of the reaction mixture are cooled in separator 18 to a temperature of 200°–600° F. by means of a cooled recycle stream. According to the aforementioned copending application, it is desirable, and therefore preferred, to cool the reaction products as quickly as possible to re-solubilize the solid inorganics as a brine. This may be facilitated by supplying pressurized colder water at or near the end of the reactor, as described above, to quench the reaction products. The temperature of the quench water is not critical and may be at any temperature below supercritical, for example, about 300° F. The resulting cooled liquid/solid mixture is removed from separator 18 through outlet 56 via stream 19, at which point it is split into two streams 20 and 25. Stream 25 may be chemically treated, if desired, to neutralize any acids present by addition of an appropriate chemical (e.g., sodium hydroxide, etc.) through line 27. The resulting neutralized material preferably has a pH of about 7. The resulting stream 28 can then be cooled in a heat exchanger (not shown) to a temperature below the supercritical temperature and recycled to separator 18 via line 29. It is preferred to tangentially introduce the recycle stream 29 into separator 18 above a channel separator 59 to provide a wetted wall and avoid salt accumulation.

Stream 20 can be cooled in the heat exchanger to facilitate disposal or further treatment.

As mentioned above, the process and apparatus described in the aforementioned copending application may involve the use of a combustion device located at the reactor inlet to bring the incoming waste/oxidant stream up to reaction temperature. For example, a suitable combustor or burner may be located at the inlet of the platelet tube reactor. A suitable fuel (e.g., alcohol, methane, methanol or similar liquid or gaseous fuel) and oxygen (or other oxidant) are separately preheated externally of the reactor and fed to the burner at the reactor entrance. Ignition of the fuel occurs at the burner face and increases the temperature of the incoming waste stream. The type and amount of fuel, and the amount of oxygen, and their respective flow rates and temperatures may be varied to control the temperature increase experienced by the waste at the reactor inlet.

Figure 8:
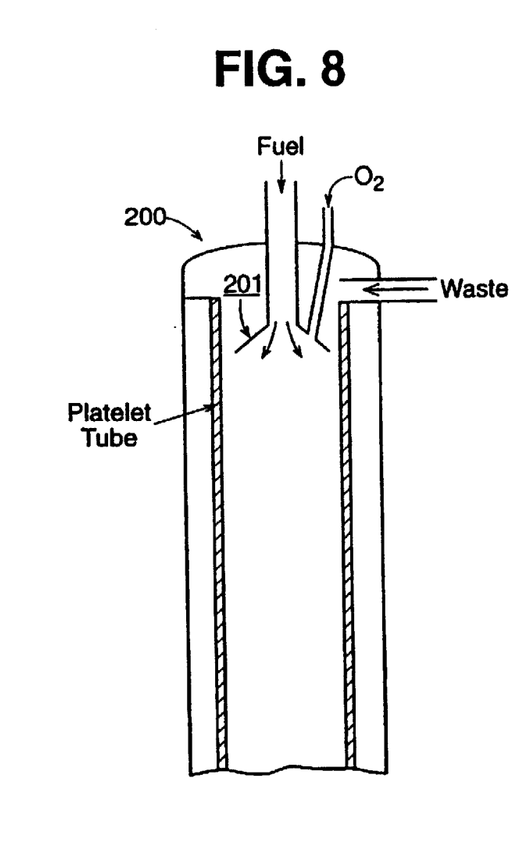
FIG. 8 schematically illustrates a burner which may be employed to heat a waste material to reaction temperature according to the disclosure in the copending application.

FIG. 8 schematically illustrates a burner located at the inlet of the platelet tube. As shown in FIG. 8, the fuel and oxygen fed to the burner 200 are mixed in the area of a cone-shaped diffuser 201, surrounded by the waste stream. When the waste stream flows over the diffuser, a low pressure center is created at the diffuser face which induces circulation and mixing of the fuel and oxygen, thereby providing an efficient ignition and heating of the waste material. Liquid and gaseous fuels of any kind can be employed. Ignition of the fuel at the diffuser face of the burner is assured by preheating both the fuel and oxygen streams, using any suitable technique.

The concept of preheating internally as described is also of particular interest in those cases where the waste or hydrocarbon containing slurry is treated at supercritical water conditions to effect separation of organic and inorganic materials. Oxidation of the separated organic materials may be performed outside of the reactor for purposes of generating power, etc. The internal preheater in the case described above serves the purpose of bringing the stream to be treated to the critical temperature and above to effect the separation desired. For example, a platelet tube reactor system may be employed to separate organics from a waste stream under supercritical conditions for subsequent oxidation, combustion, power generation, etc.

The foregoing design provides significant advantages by avoiding the solids deposition and corrosion associated with conventional supercritical water oxidation reactors.

The foregoing design overcomes other drawbacks, as well. Generally speaking, there is a concern that very large amounts of supercritical water (on the order of 1100° F.) will be needed to preheat the sludge/water mixture to the process temperature of about 1050° F. It is known that the temperature of the heating water cannot be increased much over 1100° F. due to the material strength of the vessel at that temperature and at the operating pressure of about 4000–4500 psi in the vessel. One solution to this, discussed above with respect to FIG. 8, is to use a submerged combustor in the center of the platelet to preheat the sludge/water mixture to the process temperature.

However, there is a need for alternative designs to preheat the sludge/water mixture to the process temperature, while at the same time providing those advantages of the foregoing design.

SUMMARY OF THE INVENTION

The present invention provides an improved process and apparatus for the supercritical water oxidation of organic waste and other materials, which avoid the solids deposition and corrosion problems of the prior art and which efficiently heat the waste material to oxidation temperatures.

In particular, according to the present invention, organic waste material is oxidized in supercritical water in a reaction zone of a compound platelet tube reactor which comprises inner (smaller) and outer (larger) platelet tubes supported concentrically within a shell. The compound platelet tube reactor includes, for at least part of its length, three elongated chambers: (1) a central chamber within the smaller platelet tube; (2) an outer annular chamber defined by the outer surface of the larger platelet tube and the inner surface of the shell; and (3) an inner annular chamber defined by the outer surface of the smaller platelet tube and the inner surface of the larger platelet tube. The inner annular chamber constitutes the reaction zone. The walls of each platelet tube are provided with fluid passages which permit the flow of fluid into the reaction zone through a plurality of apertures.

Supercritical water is injected into the annular reaction zone from both the outer annular chamber (through the wall of the larger platelet tube) and from the central chamber (through the wall of the smaller platelet tube). Thus, thin films of protective supercritical water are formed over substantially the entire surfaces which define the annular reaction zone, and the injected supercritical water assists in heating the mixture to reaction temperature. Thereby, the organic waste is reacted with the oxidant in the reaction zone.

The flow of the externally heated supercritical water serves to preheat the waste/oxidant stream in the reaction zone to a temperature which would initiate oxidation of the organics contained therein. Since it is not necessary to preheat the waste stream substantially before reaction, and further in view of the protection afforded by the thin films of supercritical water on the platelet tube surfaces of the reaction zone, solids deposition on, and corrosion of, those surfaces are substantially eliminated. In addition, also because of the protection afforded by the thin films of water on those surfaces, a higher reaction temperature may be employed, which improves the overall efficiency of the reaction and permits use of a smaller reactor. As a result, the required capital investment and operating costs are lower than they would ordinarily be without the advantages of the present invention.

The present invention also includes, in one embodiment, auxiliary heating means for further heating the supercritical water in the central chamber. In one aspect, the auxiliary heating means comprises a coil or rod heater. This assists in the preheating of the waste/oxidant stream to reaction temperature.

DESCRIPTION OF THE PREFERRED EMBODIMENTS

Generally, a supercritical water oxidation process comprises feeding an aqueous waste stream containing organic compounds, or a pumpable organic sludge, to a reactor along with an oxidant source and, optionally, supplemental heat if the heat value of the waste is low. Following oxidation of the organics in the reactor under conditions of temperature and pressure above the critical point of water, solid/liquid and vapor/liquid separations can be performed.

Figure 9A:
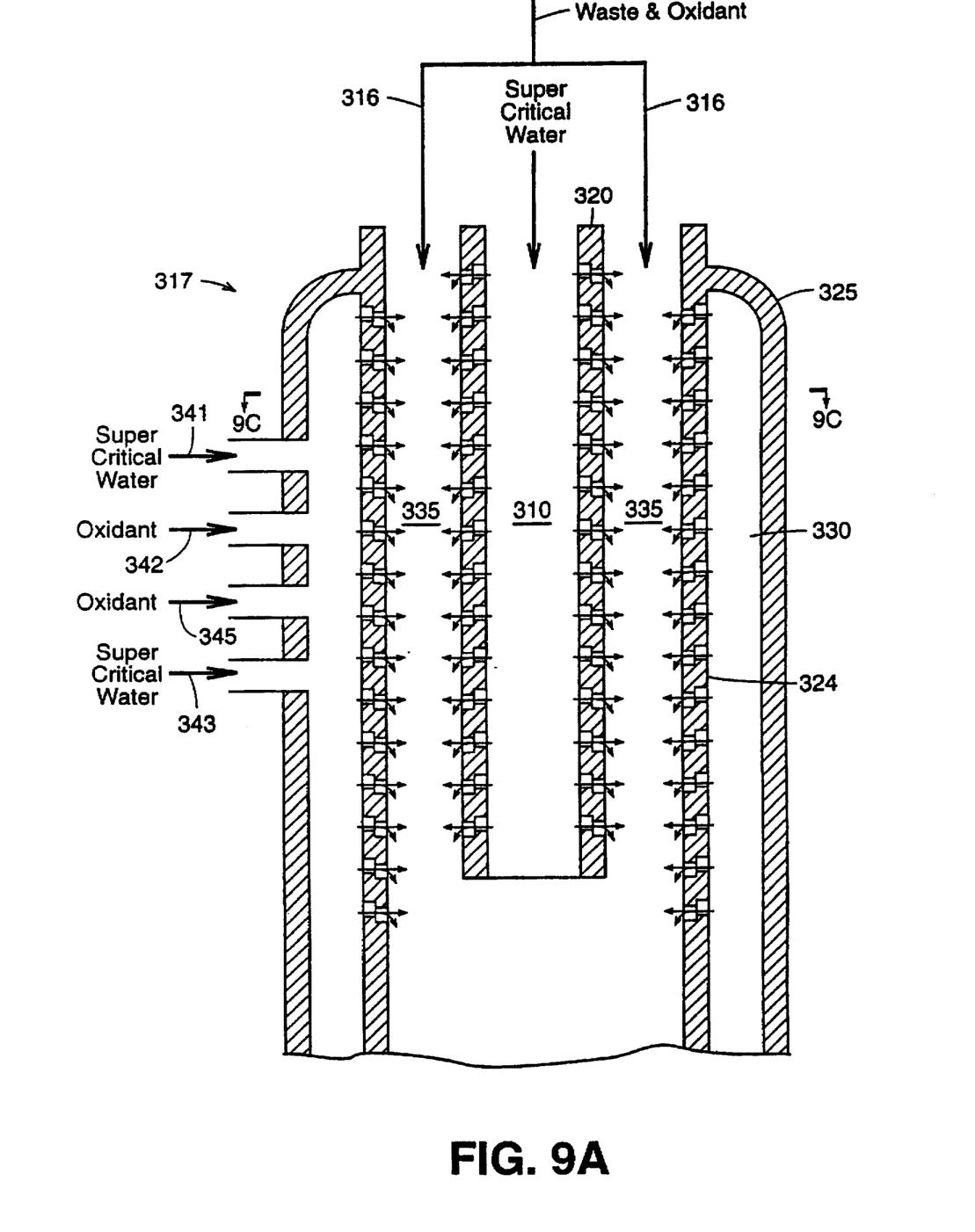
FIGS. 9A and 9B illustrate, in cross section, embodiments of the present invention in which a compound platelet tube reactor is used for preheating the sludge/water mixture to process temperature in supercritical water oxidation.
Figure 9B:
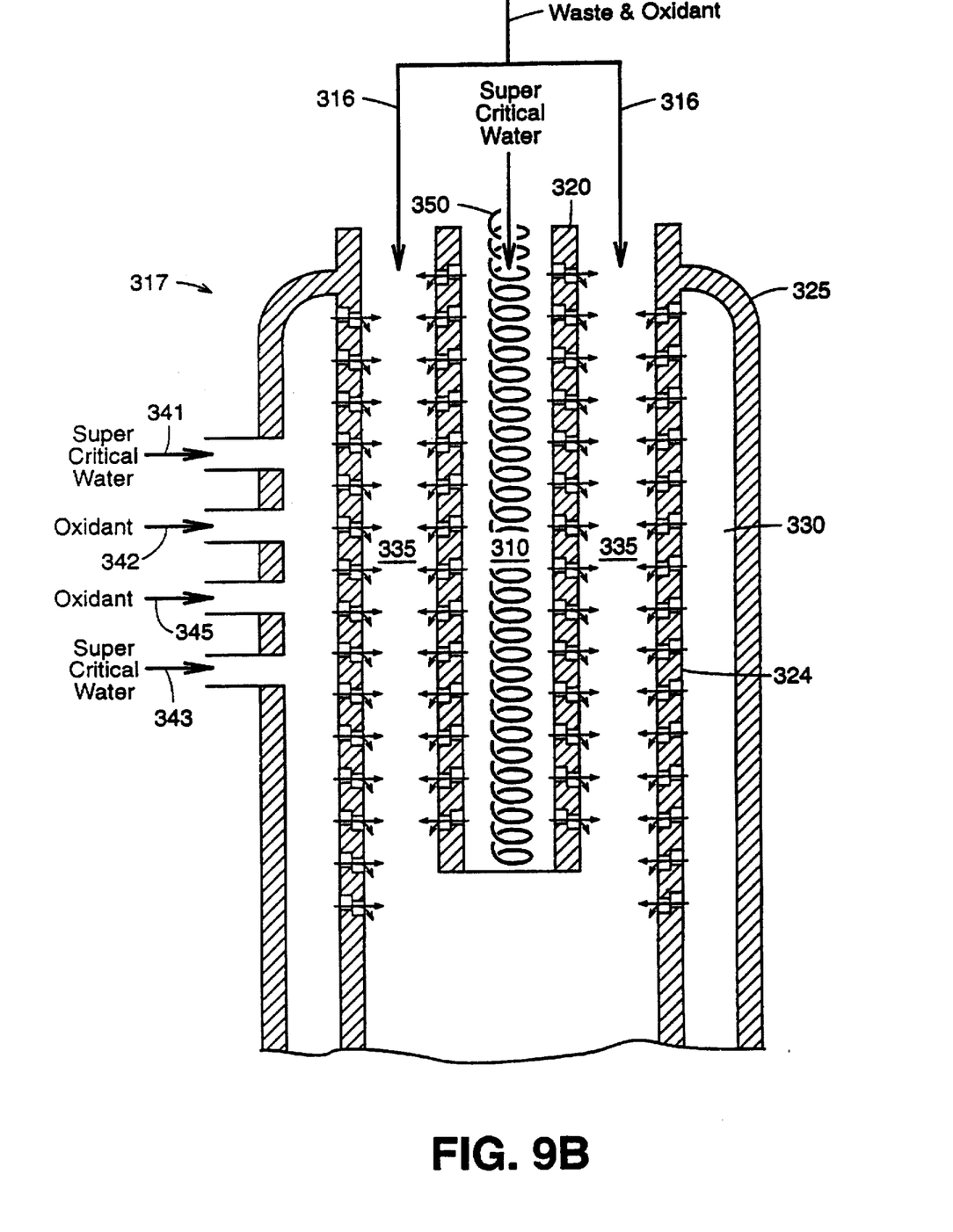
Figure 9C:
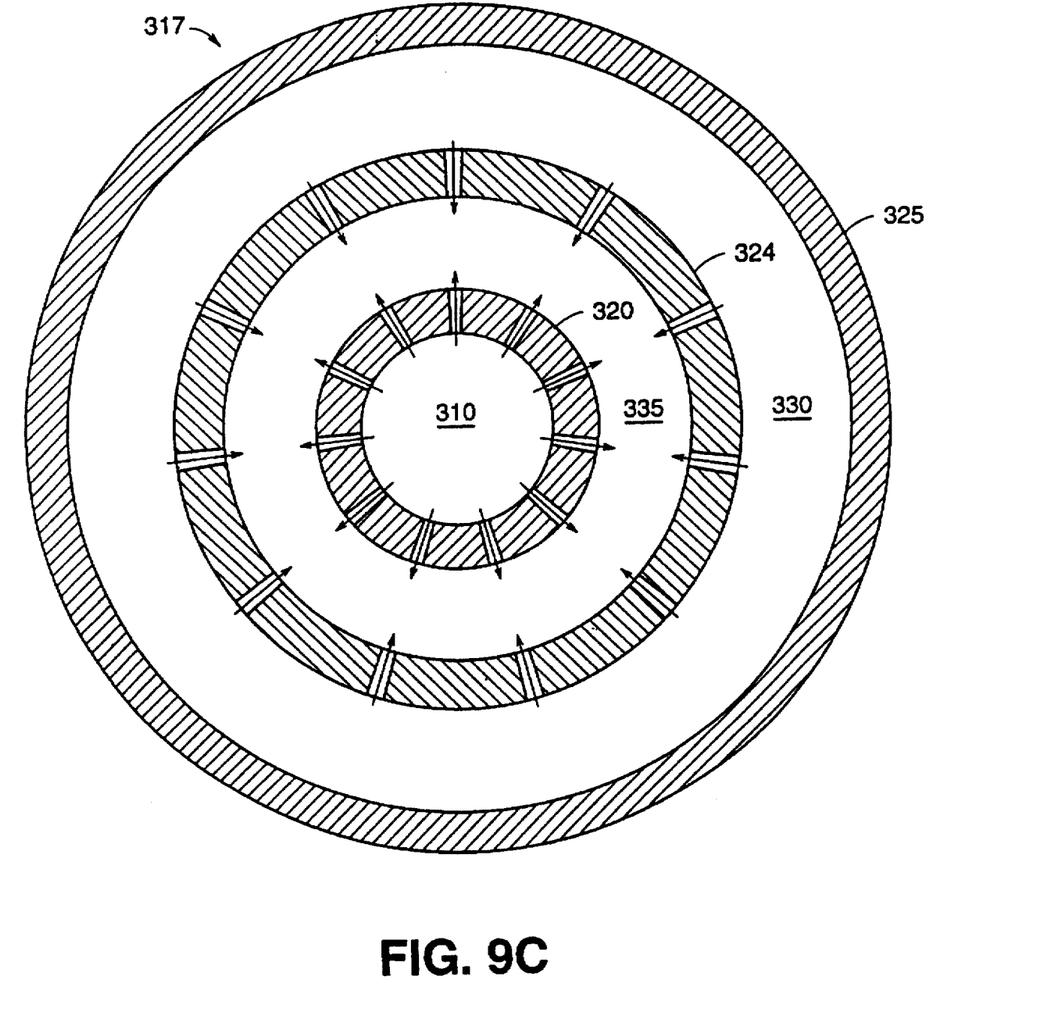
FIG. 9C is a plan view, in cross section taken along line 9C—9C in FIG. 9A, showing the chambers of the compound platelet tube reactor of the present invention.

FIGS. 9A through 9C illustrate embodiments of a process and apparatus of the present invention for the supercritical water oxidation of an organic waste material. The present invention should not be limited to the specific arrangements shown in FIGS. 9A through 9C. Nevertheless, for convenience, the present invention will be explained and illustrated by reference to those figures.

Like reference numerals in FIGS. 9A through 9C indicate corresponding or like elements.

As shown in FIGS. 9A and 9B, a waste material at a high pressure (e.g., about 3500–6000 psi) is fed with oxidant via lines 316 to annular reaction zone 335 of a compound platelet tube reactor 317. The temperature of the waste is typically ambient (e.g., about 70° F.) but may be higher. Depending on the waste material, the temperature should be no more than about 650° F. High pressure has a beneficial effect on the kinetics of the oxidation reaction in some cases. Accordingly, the minimum pressure is about 3500 psi, and it is preferred that the pressure of the waste fed to the reaction zone 335 is within the range of from about 4000 psi to about 6000 psi.

Oxygen or other suitable oxidizing agent also is supplied with the waste material to the reaction zone 335 via lines 316. Alternately, or in addition, oxygen (or other oxidant) may be supplied to one or more points along the length of the compound reactor. For example, as shown in FIGS. 9A and 9B, oxygen may be supplied to reactor 317 through lines 342 and 345. The place of oxidant addition to the reactor depends on the properties of the particular waste being treated. The addition of oxygen along the length of the reactor permits close control of the reaction rate and hence, the temperature rise within the reactor.

If necessary, such as when the intrinsic heat value of the waste material is low, a supplemental fuel could be fed to the reaction zone 335 along with the pressurized stream of waste material and oxidant. Any convenient gaseous or liquid fuel may be employed (e.g., alcohol, methane, methanol, etc.). Ignition of the supplemental fuel in the reaction zone 335 would provide additional energy necessary to sustain the oxidation reaction. Preferably, however, the temperature of the pressurized waste/oxidant stream is increased from about ambient to reaction temperature by injection of water at supercritical conditions into the waste stream as will be discussed in more detail below.

In the present invention, compound platelet tube reactor 317 comprises inner (smaller) platelet tube 320 and outer (larger) platelet tube 324 supported concentrically within a shell 325. By "platelet tube" is meant a tube whose wall is formed of a plurality of stacked, thin plates having a large number of precisely engineered fluid passages formed therein to allow a fluid such as water to pass through the wall from outside to inside, or inside to outside, depending on the direction of the pressure drop. The number and shape of the openings of those fluid passages in the wall surfaces are designed to provide a thin, protective film of water on substantially the entire platelet tube surface. Such platelet tubes have been discussed above with respect to the commonly assigned, copending U.S. patent application Ser. No. 08/320,426, filed Oct. 14, 1994.

The compound platelet tube reactor 317 includes, for at least part of its length, three elongated chambers: (1) a central chamber 310 within the smaller platelet tube 320; (2) an outer annular chamber 330 defined by the outer surface of the larger platelet tube 324 and the inner surface of the reactor shell 325; and (3) an inner annular chamber 335 defined by the outer surface of the smaller platelet tube 320 and the inner surface of the larger platelet tube 324. The inner annular chamber 335 comprises the reaction zone. The central chamber 310, the outer annular chamber 330 and the inner annular chamber (reaction zone) 335 are shown in FIG. 9C which is a plan view in cross section taken along line 9C—9C of FIG. 9A.

The reaction zone walls of the respective platelet tubes 320 and 324 are provided with fluid passages which permit the flow of fluid into the reaction zone 335 through a plurality of apertures. The inner platelet tube 320 could end abruptly, as shown in FIGS. 9A or 9B, or in a tapered manner to minimize flow discontinuities. As one having ordinary skill in the art would readily understand, the inner platelet tube is designed to optimize operating parameters based on the temperature and flowrate of the supercritical water, the volume of waste to be treated, etc.

The length of the inner platelet tube 320 is determined in accordance with conventional thermal/hydraulic engineering calculations. For example, such calculations are first performed to determine the quantity and temperature of the hot water from central chamber 310 needed to heat the aqueous waste and oxidant in the inner annular chamber 335 to a temperature such that oxidation reaction can begin in the inner annular chamber. Further engineering calculations are performed to determine the length of inner platelet tube 320 over which the calculated hot water quantity is delivered to the inner annular chamber 335. These calculations assure that the hot water entering the inner annular chamber 335 forms a protective supercritical water film over the outer surface of the inner platelet tube 320.

Supercritical water is fed both to the central chamber 310 within the smaller platelet tube 320, and to the outer annular chamber 330 defined by the larger platelet tube 324 and the inner surface of the shell 325. For example, supercritical water may be fed to the outer annular chamber 330 via one or more streams 341 and 343 along the length of the reactor as shown in FIGS. 9A and 9B, under conditions such that the resulting pressure in the outer annular chamber 330 is higher than the pressure in the reaction zone 335. Supercritical water is also fed to the central chamber 310 within the inner platelet tube 320 under conditions such that the resulting pressure in the central chamber 310 is higher than the pressure in the reaction zone 335.

As a result, supercritical water is injected into the reaction zone 335 from both the outer annular chamber 330 (through the wall of the outer platelet tube 324) and from the central chamber 310 (through the wall of the inner platelet tube 320). Thus, thin films of protective supercritical water are formed over substantially the entire surfaces which define the reaction zone 335, and the injected supercritical water assists in heating the mixture of waste material and oxidant to reaction temperature.

In this manner, the organic waste is reacted with the oxidant in the reaction zone 335.

In the design of the present invention, each of the plurality of apertures of the inner and outer platelet tubes 320 and 324 is preferably shaped so as to direct the flow of supercritical water along the inner surface of the outer platelet tube 324 and from the outer surface of the inner platelet tube 330. Also, each of the plurality of apertures of the inner and outer platelet tubes 320 and 324 is preferably shaped so as to simultaneously direct the flow of supercritical water (i) substantially perpendicularly from the inner surface of the outer platelet tube 324 and from the outer surface of the inner platelet tube 320 into the pressurized aqueous mixture in the reaction zone 335, and (ii) along the inner surface of the outer platelet tube 324 and along the outer surface of the inner platelet tube 320.

In this regard, the radial flow of supercritical water into the reaction zone will provide heat to the waste/oxidant mixture therein, and the longitudinal boundary layer water at the surfaces of the platelet tubes facing the reaction zone 335 will avoid solids deposition and corrosion.

In the alternative embodiment of FIG. 9B, the fluid in the central chamber 310 may be heated by a coil heater 350. Of course, a rod heater or equivalent heat source can be used as desired. It will be appreciated that this design augments the heating of the supercritical water fed to the inner platelet tube 320, if necessary.

Also, in the design of the present invention, the supercritical water being fed to the reaction zone 335 from the inner platelet tube 320 can be at a much higher temperature than 1100° F. and provide most of the preheating of the waste material in the reaction zone 335. The inner platelet tube 320 can be designed for operation at 1500° F. or higher temperatures because of an operating pressure significantly less than 4500 psi that it will experience. In fact, this inner platelet water could be at a temperature of 1500° F. or higher and heated in a variety of ways. In one aspect, it could be partially or totally heated externally (before entering the inner platelet tube 320). Alternatively, it could be partially or totally heated by the coil (or rod) heater 350 shown in FIG. 9B. Further, one having ordinary skill in the art will recognize that the supercritical water flow rate and temperature can be controlled along the platelet tube length to maximize process efficiency by using suitable flowmeters, temperature gauges, valves, and other fluid control devices (not shown).

While the method and apparatus of the present invention have been discussed above with respect to supercritical water oxidation of an organic waste material, this arrangement also is equally applicable to subcritical conditions where an internal heat source is desired and there is a concern for solids deposition and corrosion.

In general, the waste material to be treated according to the present invention may be any material containing organic and inorganic compounds. Typically, the waste material is an aqueous wastewater containing organic compounds, and even toxic organics, such as sewage sludges, pyrotechnics, dyes, phenols, etc. Additionally, materials such as municipal or industrial wastes, coal, etc., may be treated according to the present invention. The particular organic compounds which are contained in the waste material, and their concentration, is of importance only in regard to the rate of reaction and the maximum temperature achieved by the oxidation process. In other words, any organic compound in any concentration can be oxidized according to the present invention as long as oxygen is provided and the rate of reaction and maximum temperature can be controlled. In addition, when the process of the present invention is operated in the absence of oxygen or with less than the stoichiometric amount of oxygen (e.g., to separate the organic and inorganic components of the waste stream, as described below), the concentration of the waste material is less critical as long as the slurry or other form of waste material is pumpable or flowable.

In general, if necessary to provide pumpability or to reduce the heat content of the waste stream, water may be added. However, since addition of water, as well as the introduction of supercritical water to the reaction zone, increases the mass and volume of material flowing through the reaction zone, the size and hence the expense of the reactor may increase, as well as the expense of treating the liquid contained in the reaction products. It is therefore preferred that any pre-reaction addition of water to the waste material be limited to that amount necessary to make the waste flowable or pumpable and to prevent extreme reaction excursions.

The residence time of the reactants in the reaction zone is dependant on several factors, including the temperature, the size of the reactor, the flow rates of materials into and through the reaction zone, etc. As a general rule, the present invention permits reaction temperatures to be higher than the temperatures of prior art supercritical water oxidation processes. In the past, the maximum temperature of reaction in such processes was about 1100° F. due to the limitations of available reactor materials. At temperatures higher than about 1200° F. and high pressures, containment design using conventional reactor materials cannot be used due to lack of strength, resulting in excessive thickness as well as exposure to a corrosive environment. However, in the present invention, because the surfaces of the platelet tubes are protected by thin films of supercritical water and the pressure containment tube temperature is limited to that of the clean supercritical water in the reaction zone, reaction temperatures higher than 1200° F. may be employed.

Typically, in the present invention, the reaction temperature may vary from about 1100° F. to about 1800° F., or higher, and is preferably about 1250° F. At those temperatures, the flow rates may be selected to provide a residence time in the reaction zone of about 5–20 seconds. In theory, the reaction temperature may be increased even further as long as a sufficient amount of supercritical water can be fed through the respective platelet tube walls to keep protective films on the surfaces defining the reaction zone. The reaction temperature may be controlled by controlling the concentration of organics in the waste stream which in effect regulates the heat of reaction per pound of material in the reactor. The use of high reaction temperatures in the present invention provides a significant advantage. In particular, as the reaction temperature increases, the rate of the oxidation reaction increases and the reactor size may be correspondingly decreased because a shorter residence time is necessary. As a general rule, for every increase in reaction temperature of about 20°–30° F., the reaction rate approximately doubles.

The size and wall thickness of the compound reactor 317 are not critical and may be varied to suit the particular requirements of any given situation. As a general rule, the size of the platelet tubes will be determined by the amount of waste material being treated, its velocity and flow rate through the tubes, the need to protect the surfaces with a thin film of supercritical water, etc. The pressure tube (shell) of the compound reactor 317 is designed in accordance with established codes such as ASME Section I or Section VIII. The reactor or platelet tube design is dictated by the flow requirements of clean water through the platelet tubes to protect the walls thereof.

The mechanical design of the platelet tubes takes into account the pressure drop across the platelet tube wall (generally less than 500 psi) and the temperature which is controlled by the supercritical fluid flowing through the platelet tube wall. The number of platelet holes or slots and their orientation is dictated by the nature of and the quantity of the waste stream being processed.

The materials of construction of the compound platelet tube reactor 317 used in the present invention are not critical, and those skilled in the art can select appropriate materials of construction depending upon the waste being treated and the conditions of reaction. Typically, the respective platelet tubes and the outer shell 325 will be constructed of an alloy which has good high temperature properties, corrosion resistance, stress corrosion crack resistance, etc. In fact, since the reactor shell is not in contact with the waste materials and typically is not exposed to the high temperatures existing in the reaction zone 335, it is usually sufficient simply to fabricate a shell according to the well-known principles of high pressure vessels.

The size of the compound platelet tube reactor 317 will vary depending principally upon the amount and type of waste to be treated. For example, in order to process 400,000 pounds per hour of a liquid wastewater having a concentration of sludge of 20% with a HHV of 5,000 BTU per pound, it is estimated that three (3) reactors would be required, each having a diameter of approximately 4 feet and a height of about 15 feet.

At the end of the reaction zone 335, the material exiting the reactor, which is a mixture of gaseous oxidation reaction products, insoluble inorganic material, and steam, is usually still at supercritical water conditions. After removing (venting) the gaseous products, it is desirable to cool the resulting gaseous/solid mixture to solubilize the solid inorganic material and to facilitate separation and disposal of the solids. This can be done using any convenient technique, such as dry physical separation (e.g., using a cyclone separator) or wet chemical separation.

What is claimed is:

1. An apparatus for the supercritical water oxidation of organic waste material comprising:

a compound platelet tube reactor which comprises inner and outer platelet tubes supported concentrically within an outer shell, said compound reactor comprising, at least for part of its length, three elongated chambers: (i) a central chamber within the inner platelet tube, (ii) an outer annular chamber defined by the outer surface of the outer platelet tube and the inner surface of the reactor shell and (iii) an inner annular chamber comprising a reaction zone and defined by the outer surface of the inner platelet tube and the inner surface of the outer platelet tube, said inner and outer platelet tubes being formed from a plurality of thin plates assembled into tube shapes and provided with a plurality of fluid passages, which permit the flow of fluid into the reaction zone through a plurality of apertures;

means for feeding a pressurized aqueous reaction mixture of the waste material and an oxidant source at ambient temperature to the reaction zone;

means for feeding supercritical water to at least one point along said outer annular chamber and to said central chamber such that supercritical water is injected into the reaction zone from both said outer annular chamber and from said central chamber, forming thin films of protective supercritical water over substantially the entire surfaces which define the reaction zone and heating the mixture of waste material and oxidant to reaction temperature; and means for removing a resulting reaction product from said reaction zone.

2. The apparatus of claim 1 wherein the temperature of the pressurized aqueous mixture fed to the reaction zone is at most about 650° F.

3. The apparatus of claim 2 wherein the pressurized aqueous mixture is at about ambient temperature.

4. The apparatus of claim 1 wherein the reaction is conducted at a temperature of from about 1100° F. to about 1800° F.

5. The apparatus of claim 4 wherein the reaction is conducted at a pressure of from about 3500 to about 6000 pounds per square inch.

6. The apparatus of claim 1 wherein the supercritical water is fed to the outer platelet tube at one point through the shell of the compound reactor.

7. The apparatus of claim 1 wherein the supercritical water is fed to the outer platelet tube at multiple points through the shell of the compound reactor.

8. The apparatus of claim 1 further comprising feeding additional oxidant to the reaction zone together with the supercritical water.

9. The apparatus of claim 1 further comprising auxiliary heating means for heating water in the inner platelet tube.

10. The apparatus of claim 9 wherein said auxiliary heating means comprises a coil or rod heater.

11. The apparatus of claim 1 wherein each of the plurality of apertures of the inner and outer platelet tubes is shaped so as to direct the flow of supercritical water along the inner surface of the outer platelet tube and the outer surface of the inner platelet tube.

12. The apparatus of claim 1 wherein each of the plurality of apertures of the inner and outer platelet tubes is shaped so as to simultaneously direct the flow of supercritical water (i) substantially perpendicularly from the inner surface of the outer platelet tube and the outer surface of the inner platelet tube into the pressurized aqueous mixture in the reaction zone, and (ii) along the inner surface of the outer platelet tube and along the outer surface of the inner platelet tube.

* * * * *